United States Patent
Emmanuel et al.

(10) Patent No.: US 9,967,884 B2
(45) Date of Patent: May 8, 2018

(54) DEDICATED BACKHAUL FOR WHOLE HOME COVERAGE

(71) Applicant: NETGEAR, INC., San Jose, CA (US)

(72) Inventors: Joseph Amalan Arul Emmanuel, Cupertino, CA (US); Peiman Amini, Mountain View, CA (US)

(73) Assignee: NETGEAR, INC., San Jose, CA (US)

( * ) Notice: Subject to any disclaimer, the term of this patent is extended or adjusted under 35 U.S.C. 154(b) by 63 days.

(21) Appl. No.: 15/271,912

(22) Filed: Sep. 21, 2016

(65) Prior Publication Data

US 2017/0135104 A1    May 11, 2017

Related U.S. Application Data

(60) Provisional application No. 62/253,540, filed on Nov. 10, 2015, provisional application No. 62/336,503, filed on May 13, 2016.

(51) Int. Cl.
*H04W 72/04* (2009.01)
*H04L 12/44* (2006.01)
(Continued)

(52) U.S. Cl.
CPC ......... *H04W 72/0453* (2013.01); *H04L 12/44* (2013.01); *H04L 43/0888* (2013.01); *H04L 43/0894* (2013.01); *H04L 43/10* (2013.01); *H04L 43/16* (2013.01); *H04L 45/20* (2013.01); *H04W 4/023* (2013.01); *H04W 24/06* (2013.01); *H04W 24/08* (2013.01); *H04W 36/30* (2013.01); *H04W 36/36* (2013.01); *H04W 40/12* (2013.01);
(Continued)

(58) Field of Classification Search
CPC . H04W 72/0453; H04W 40/12; H04W 36/36; H04W 76/025; H04W 4/023; H04W 24/08; H04W 24/06; H04W 36/30; H04W 72/085; H04L 43/0894; H04L 43/0888; H04L 43/10; H04L 45/20; H04L 43/16; H04L 12/44
See application file for complete search history.

(56) References Cited

U.S. PATENT DOCUMENTS 9,179,495 B1 * 11/2015 Scherzer ............... H04W 84/12
9,832,796 B2 * 11/2017 Mehta .................. H04W 76/02
(Continued)

OTHER PUBLICATIONS

WLAN high availability HP Oct. 2014.*

*Primary Examiner* — Jay P Patel
(74) *Attorney, Agent, or Firm* — Perkins Coie LLP

(57) ABSTRACT

A dedicated backhaul for whole home coverage variously applies optimization techniques, e.g. using the 5 GHz high band or low band as a dedicated backhaul; using the 2.4 GHz band as backup if the 5 GHz band fails to reach between nodes; using Ethernet when it is better than the 5 GHz and 2.4 GHz bands and it is available; and using a spanning tree protocol or a variant to avoid loops. The dedicated backhaul is used if the received signal strength indication (RSSI) of the dedicated channel is above a threshold. In embodiments, a daisy chain uses probe request contents to communicate hop count and link quality between the nodes by attempting to route directly if link quality is better than a defined threshold. For each extra hop, there must be some percentage gain over smaller hops. If the link is below some threshold, it is not used.

21 Claims, 12 Drawing Sheets

(51) Int. Cl.
    *H04L 12/26* (2006.01)
    *H04L 12/733* (2013.01)
    *H04W 4/02* (2018.01)
    *H04W 24/08* (2009.01)
    *H04W 36/30* (2009.01)
    *H04W 36/36* (2009.01)
    *H04W 24/06* (2009.01)
    *H04W 40/12* (2009.01)
    *H04W 84/18* (2009.01)
    *H04W 84/12* (2009.01)
    *H04W 24/04* (2009.01)
    *H04W 72/08* (2009.01)

(52) U.S. Cl.
    CPC ............ *H04W 76/15* (2018.02); *H04W 24/04* (2013.01); *H04W 72/085* (2013.01); *H04W 76/10* (2018.02); *H04W 84/12* (2013.01); *H04W 84/18* (2013.01)

(56) References Cited

U.S. PATENT DOCUMENTS

| | | | | |
|---|---|---|---|---|
| 2008/0025208 A1* | 1/2008 | Chan | .................. | H04L 12/42 370/217 |
| 2009/0046655 A1* | 2/2009 | Zhao | .................... | H04W 24/04 370/331 |
| 2009/0252127 A1* | 10/2009 | Rangarajan | ........... | H04W 16/10 370/338 |
| 2010/0118830 A1* | 5/2010 | Stephenson | ............. | H04L 63/10 370/331 |
| 2011/0081903 A1* | 4/2011 | Cai | ................... | H04W 36/0055 455/424 |
| 2011/0286404 A1* | 11/2011 | Abraham | ............... | H04L 1/1614 370/329 |
| 2012/0020319 A1* | 1/2012 | Song | ................. | H04W 72/1231 370/330 |
| 2012/0294200 A1* | 11/2012 | Wang | .................... | H04W 76/02 370/277 |
| 2013/0194948 A1* | 8/2013 | Mallik | .................. | H04W 24/00 370/252 |
| 2014/0233412 A1* | 8/2014 | Mishra | ................ | H04W 72/085 370/252 |
| 2014/0270306 A1* | 9/2014 | Luna | ........................ | H04R 3/00 381/334 |
| 2015/0029067 A1* | 1/2015 | Pang | ...................... | H01Q 13/10 343/770 |
| 2015/0049616 A1* | 2/2015 | Ho | ........................ | H04W 24/02 370/252 |
| 2015/0264614 A1* | 9/2015 | Stager | ............... | H04W 36/0061 370/332 |
| 2015/0334750 A1* | 11/2015 | Mehta | ................... | H04W 24/02 370/329 |
| 2016/0007273 A1* | 1/2016 | Farid | ..................... | H04W 48/16 370/329 |
| 2016/0142163 A1* | 5/2016 | Sirotkin | ................ | H04W 48/06 370/338 |
| 2016/0286374 A1* | 9/2016 | Baghel | ................. | H04B 17/318 |
| 2016/0366632 A1* | 12/2016 | Cui | ........................ | H04W 40/04 |
| 2017/0048913 A1* | 2/2017 | Teyeb | ................... | H04W 48/18 |
| 2017/0070919 A1* | 3/2017 | Verger | .................... | H04L 43/00 |
| 2017/0125920 A1* | 5/2017 | Spiel | ...................... | H01Q 21/28 |
| 2017/0127295 A1* | 5/2017 | Black | ..................... | H04W 16/28 |
| 2017/0127325 A1* | 5/2017 | Vikberg | ................. | H04L 5/0035 |
| 2017/0164260 A1* | 6/2017 | Shi | ........................ | H04W 36/30 |
| 2017/0215091 A1* | 7/2017 | Ling | ....................... | H04W 16/28 |
| 2017/0251410 A1* | 8/2017 | Comstock | ......... | H04W 36/0066 |
| 2017/0325243 A1* | 11/2017 | Yasukawa | ........... | H04W 72/085 |

* cited by examiner

DEDICATED BACKHAUL FOR WHOLE HOME COVERAGE

CROSS REFERENCE TO RELATED APPLICATIONS

This application is entitled to the benefit of and the right of priority to U.S. provisional patent application No. 62/253,540, entitled METHOD AND APPARATUS FOR WHOLE HOME WI-FI COVERAGE, filed Nov. 10, 2015; and to U.S. provisional patent application No. 62/336,503, entitled DEDICATED BACKHAUL FOR WHOLE HOME COVERAGE, filed May 13, 2016; all of which are hereby incorporated herein in their entireties by this reference thereto.

This application is related to co-pending U.S. patent application Ser. No. 15/287,704, entitled RATE ESTIMATION IN A WIRELESS MESH NETWORK, filed Oct. 6, 2016; U.S. patent application Ser. No. 15/287,706, entitled ROAMING IN A WIRELESS MESH NETWORK, filed Oct. 6, 2016; U.S. patent application Ser. No. 15/287,711, entitled DEDICATED BACKHAUL LINK FOR A ROBUST WIRELESS MESH NETWORK, filed Oct. 6, 2016, all of which are hereby incorporated herein in their entireties by this reference thereto.

FIELD

The invention relates to telecommunications networks. More particularly, the invention relates to a dedicated backhaul for whole home coverage.

BACKGROUND

In a hierarchical telecommunications network the backhaul portion of the network comprises the intermediate link between the core network, or backbone network and the small subnetworks at the edge of the entire hierarchical network. In the home, such network can comprise an access point (AP) with links to various repeaters. A mesh network is often used to establish a wireless backhaul between the AP and the various repeaters. With mesh networking, access points are connected wirelessly and exchange data frames with each other to forward traffic to/from a gateway point, such as the AP. However, a mesh network is difficult to set up and maintain, especially where intermediate links between the edge and the access point are added, such as when intermediate repeaters relay traffic between the AP and a remote repeater that is out of range of the AP.

SUMMARY

A dedicated backhaul for whole home coverage variously applies optimization techniques, e.g. using the 5 GHz high band or low band as a dedicated backhaul; using the 2.4 GHz band as backup if the 5 GHz band fails to reach between nodes; using Ethernet when it is better than the 5 GHz and 2.4 GHz bands and it is available; and using a spanning tree protocol or a variant to avoid loops. The dedicated backhaul is used if the received signal strength indication (RSSI) of the dedicated channel is above a threshold. In embodiments, a daisy chain uses probe request contents to communicate hop count and link quality between the nodes by attempting to route directly if link quality is better than a defined threshold. For each extra hop, there must be some percentage gain over smaller hops. If the link is below some threshold, it is not used.

DRAWINGS

DESCRIPTION

Figure 1:
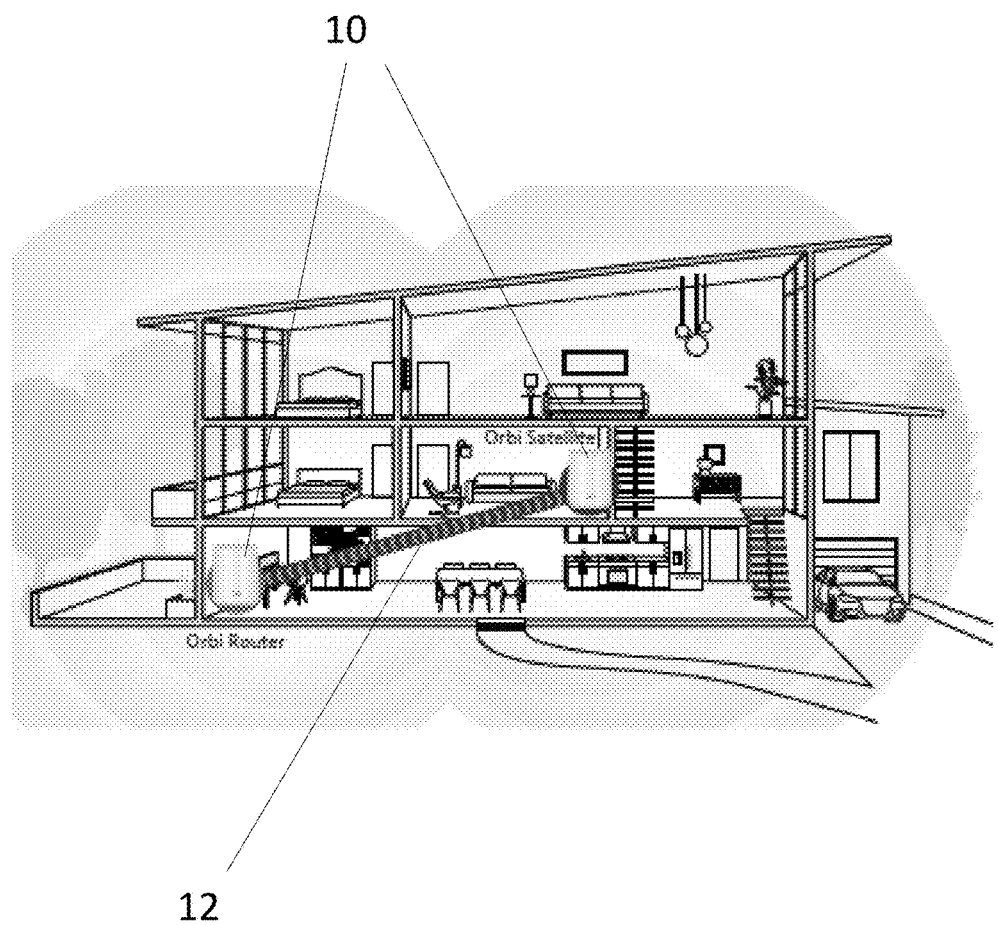
FIG. 1 is a schematic diagram showing a dedicated backhaul for whole home coverage according to the invention.

Embodiments of the invention provide several techniques for establishing and maintaining a dedicated backhaul for whole home coverage. FIG. 1 is a schematic diagram showing a dedicated backhaul for whole home coverage according to the invention. In FIG. 1, a system of smart Wi-Fi nodes 10 includes a dedicated backhaul 12 to provide whole home coverage and the fastest speed to the Internet. In operation, a router is placed in service as the access point (AP). A satellite device is then added, synced to the AP, and a dedicated backhaul is established there between. LEDs on the devices indicate progress and success with syncing of the devices.

Embodiments of the invention variously apply optimization techniques, such as using the 5 GHz high band or low band as a dedicated backhaul; using the 2.4 GHz band as backup if the 5 GHz band fails to reach between nodes; using Ethernet when it is better than the 5 GHz and 2.4 GHz bands and it is available; and using a spanning tree protocol or a variant to avoid loops.

In connection with embodiments of the invention, a spanning tree protocol is a network protocol that builds a logical loop-free topology for Ethernet networks, the basic function of which is to prevent bridge loops and the broadcast radiation that results from them. Spanning tree also allows a network design to include spare (redundant) links to provide automatic backup paths if an active link fails. This is done without the danger of bridge loops, or the need for manual enabling or disabling of these backup links. As the name suggests, the spanning tree algorithm creates a spanning tree within a network of connected layer-2 bridges, and disables those links that are not part of the spanning tree, leaving a single active path between any two network nodes. The spanning tree algorithm was originally standardized as IEEE 802.1D, but the functionality, spanning tree, rapid spanning tree and multiple spanning tree previously specified in 802.1D, 802.1s and 802.1w respectively has been incorporated into IEEE 802.1Q-2014.

In embodiments of the invention, the dedicated backhaul is used if the received signal strength indication (RSSI) of the dedicated channel is above a threshold. The threshold is a parameter that can be defined and modified on the hardware after hardware qualification is done.

Some embodiments of the invention apply a daisy chain approach (discussed below), which uses probe request contents to communicate hop count and link quality between the nodes. Such embodiments attempt to route directly if link quality is better than a defined threshold. For each extra hop, there must be some percentage gain over smaller hops. If the link is below some threshold, it is not used; and Wi-Fi protected setup (WPS) is extended across several nodes so the node can join on anyone.

When a new node is added to the network, the node sees the contents of the information element for a daisy chain from all neighboring nodes. In addition to the content, the node checks signal strength of other APs using the content of the information element (hop count, data rate to main AP) and RSSI of the neighboring node. The node then decides to which AP it is to connect. Preference is given to the main AP or nodes with less hop to avoid extra delay and the overhead of multiple hops.

In some embodiments of the invention the backhaul is used to push a configuration. In such embodiments of the invention the nodes that are in the network and are talking over backhaul channels can configure a new node. Configuration can be pushed by pressing buttons or by an app on a smartphone.

There is a sync button on each unit. A user can press the sync button on a new unit and press the sync button on any previously present unit. The sync triggers a software process which results in the new unit being programmed by units that are already on the network. In the process, the new unit receives a Wi-Fi configuration, networking configuration, and other configuration files.

The phone app can trigger the sync process by communicating with the new unit and previously existing units using Wi-Fi, Bluetooth, or both.

The 5 GHz high band is defined as a dedicated backhaul in embodiments of the invention. The high band is defined in US as channels 100 to 140+149 to 165 and in Europe as DFS band channels 100 to 140. If the dedicated wireless link falls below the quality threshold, the 2.4 GHz band may be used as a backup option. The decision as which band is used for backhaul may differ from satellite to satellite.

Figure 2:
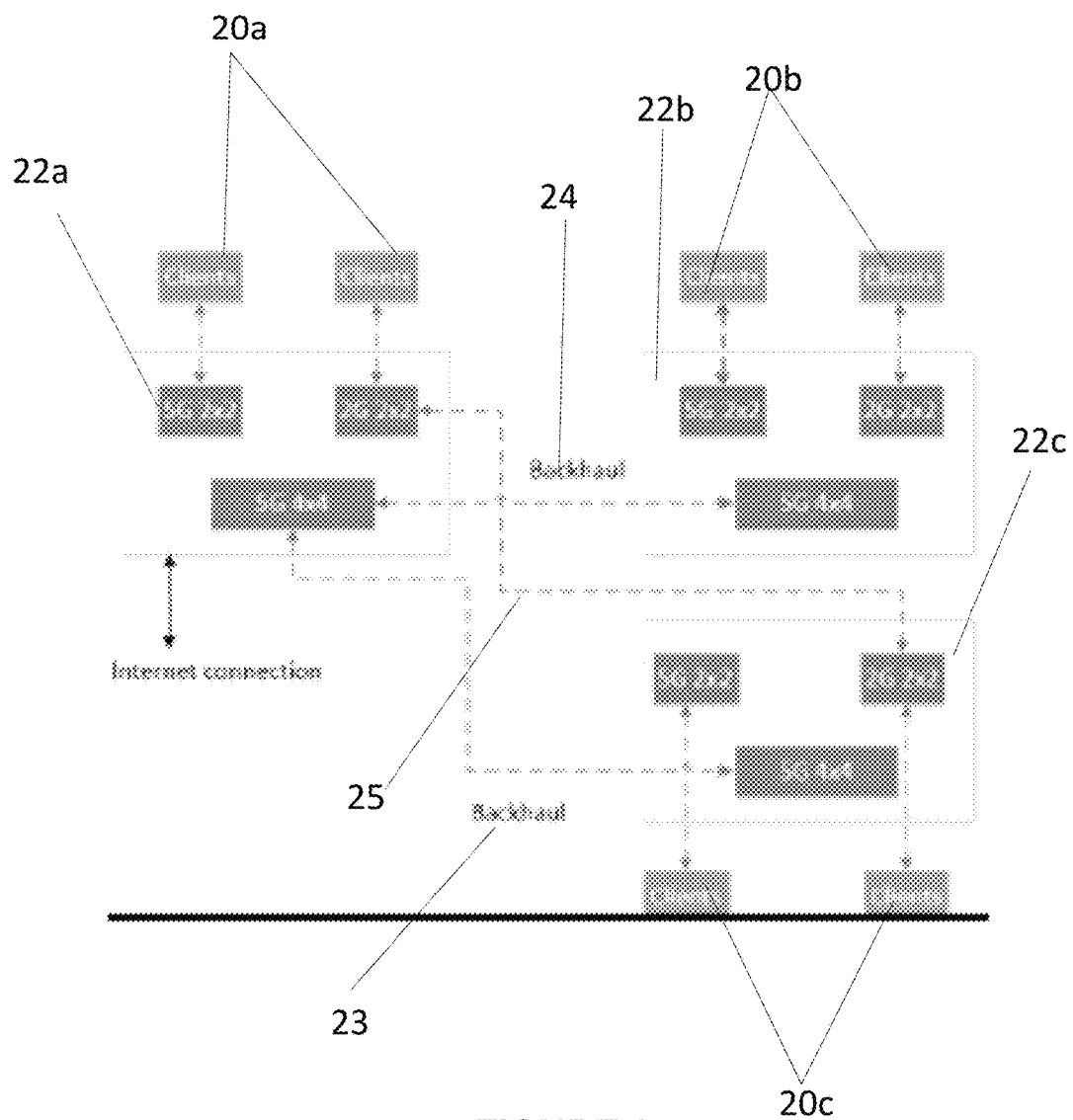
FIG. 2 is a schematic diagram showing a 5 GHz backhaul according to the invention.

FIG. 2 is an example in which the dedicated 5 GHz band is used as a method of communication between two devices. In FIG. 2, a plurality of client devices 20a-20c are associated with respective nodes 22a-22c. The nodes each include one or more 2.4 GHz radios and one or more 5 GHz radios. The nodes are connected by dedicated 5 GHz backhaul connections 23, 24. A 2.4 GHz connection 25 may be used as a backhaul when a 5 GHz connection is not available. When a 2.4 GHz connection is used as the backhaul it is shared for both clients and for the backhaul. Those skilled in the art will appreciate that any other connection may be substituted for the 5 GHz backhaul connection when such connection is not available, including for example another 5 GHz radio, a radio in a band other than 5 GHz and 2.4 GHz, etc.

Figure 3:
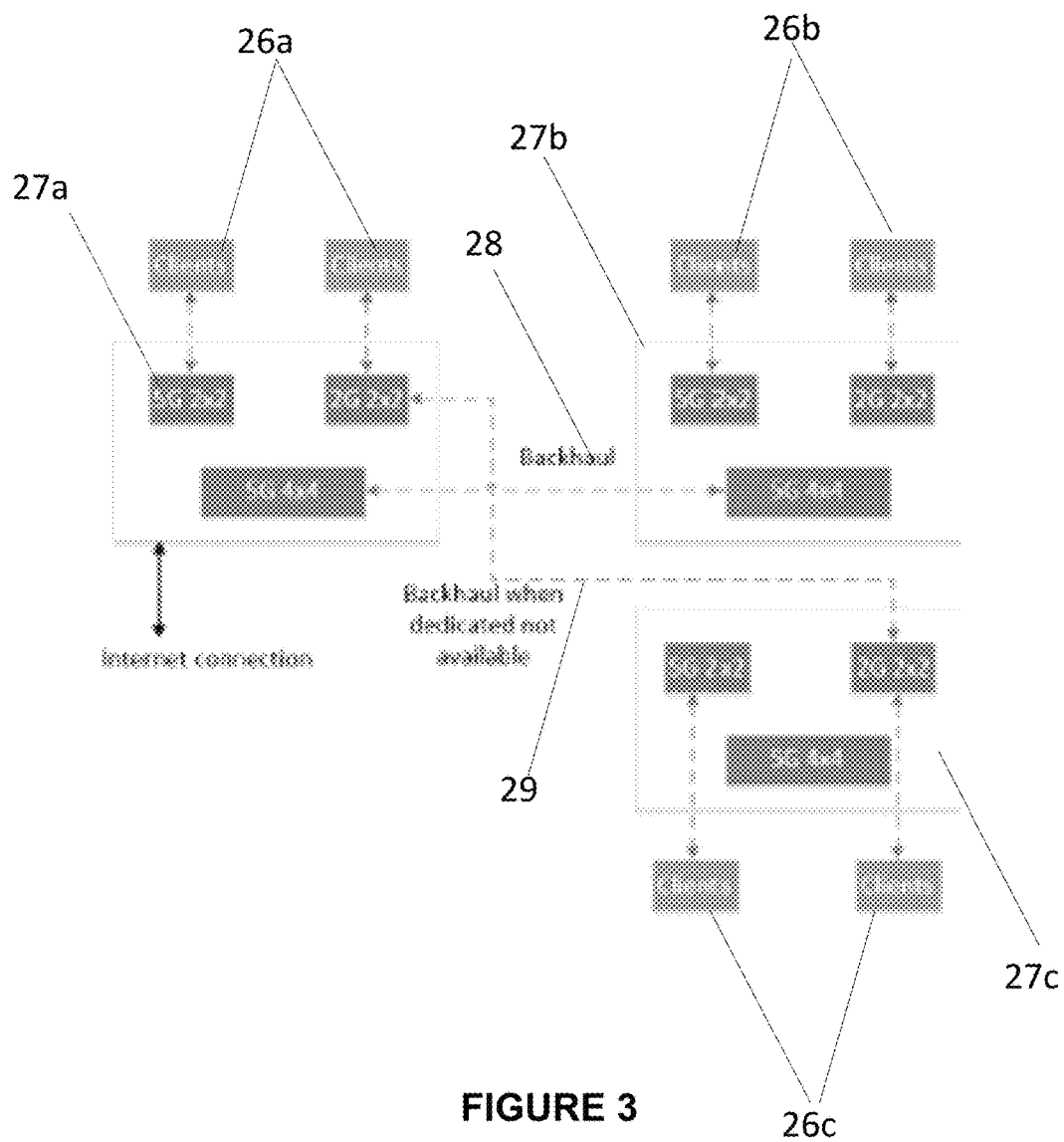
FIG. 3 is a schematic diagram showing a 5 GHz backhaul (FIG. 2A) 2.4 GHz and 5 GHz backhaul (FIG. 2B) according to the invention.

FIG. 3 is an example in which the dedicated 5 GHz band is used for one satellite and the 2.4 GHz is used for another satellite. In FIG. 3, a plurality of client devices 26a-26c are associated with respective nodes 27a-27c. The nodes each include one or more 2.4 GHz radios and one or more 5 GHz radios. The nodes 27a, 27b are connected by a dedicated 5 GHz backhaul connection 28. A 2.4 GHz connection 29 is used as a dedicated backhaul between the nodes 27a, 27c when a 5 GHz connection is not available.

Figure 4:
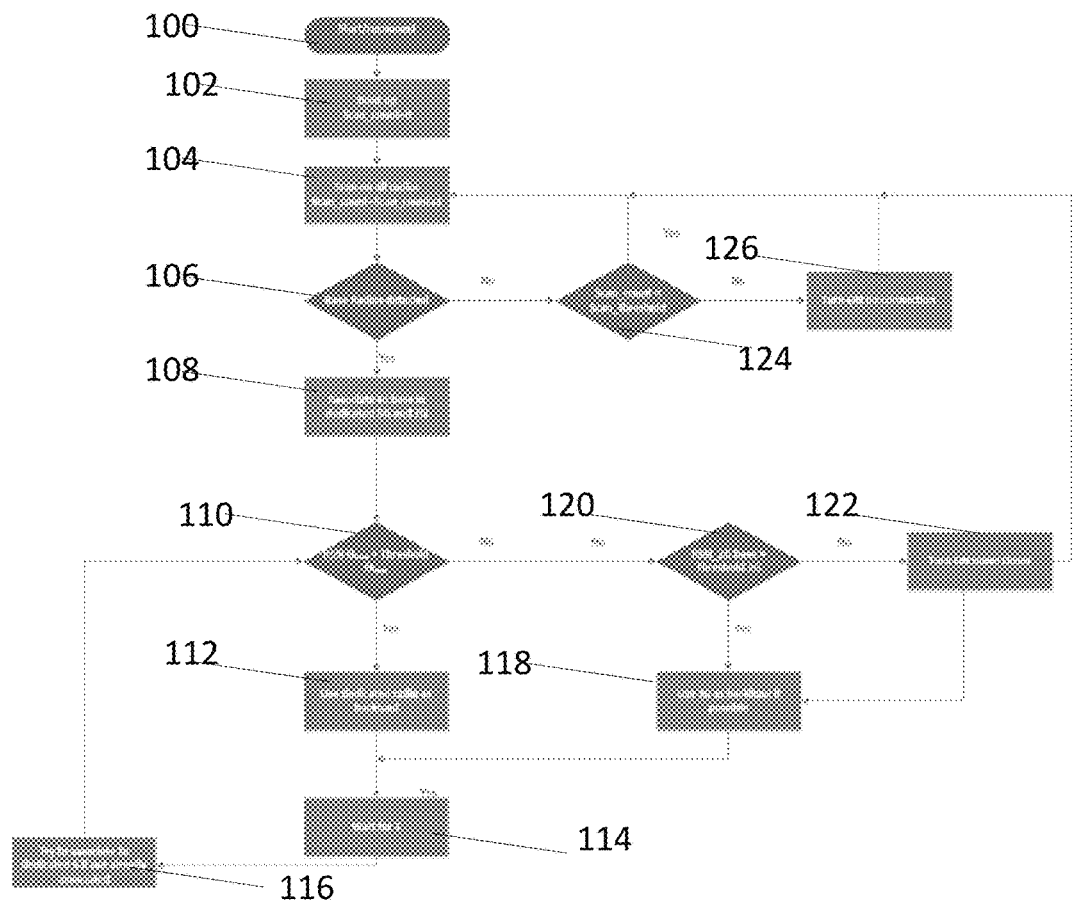
FIG. 4 is a flow diagram showing a star topology boot up operational phase of a dedicated backhaul for whole home coverage according to the invention.
Figure 5:
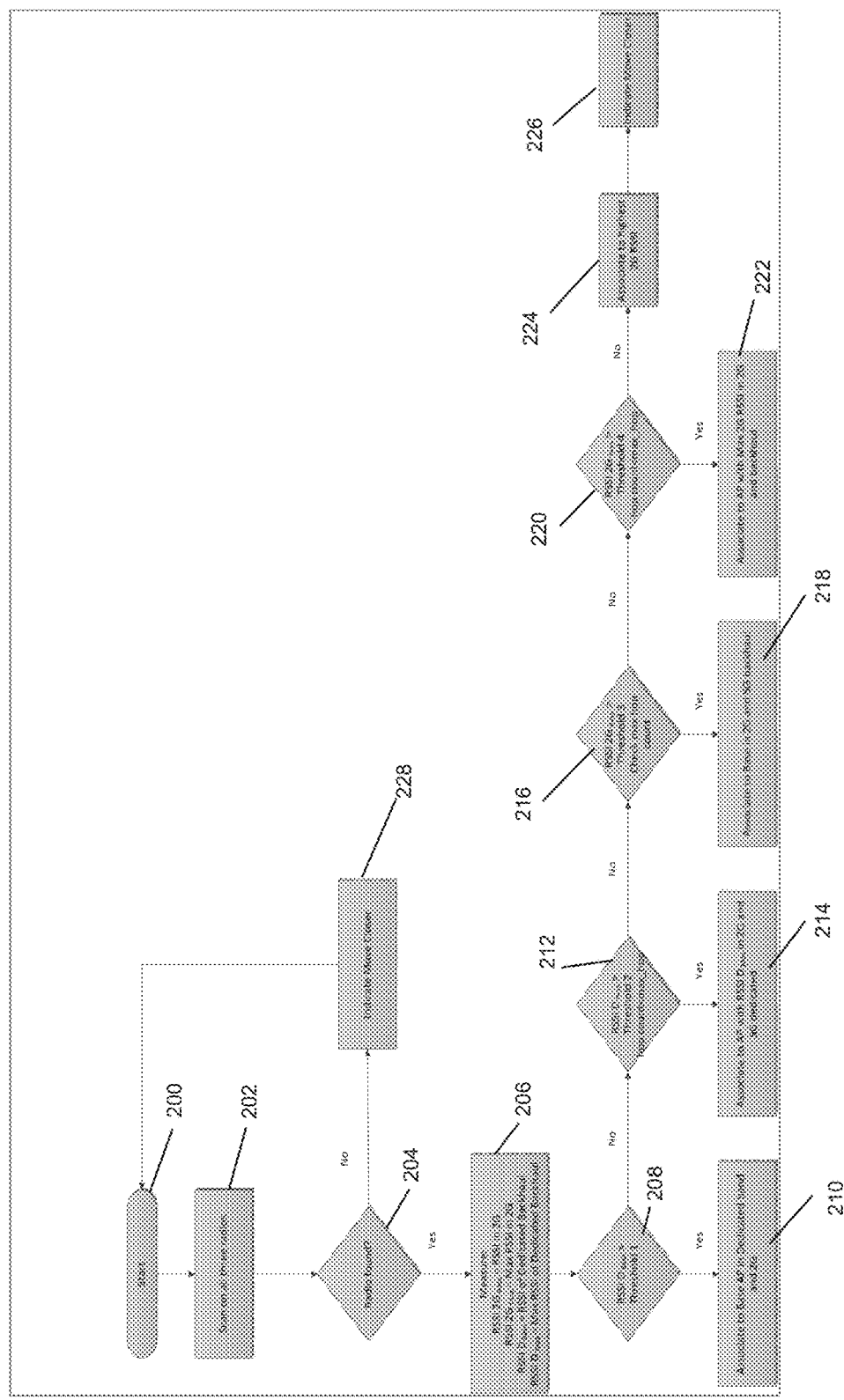
FIG. 5 is a flow diagram showing a daisy chain operational phase of a dedicated backhaul for whole home coverage according to the invention.
Figure 6:
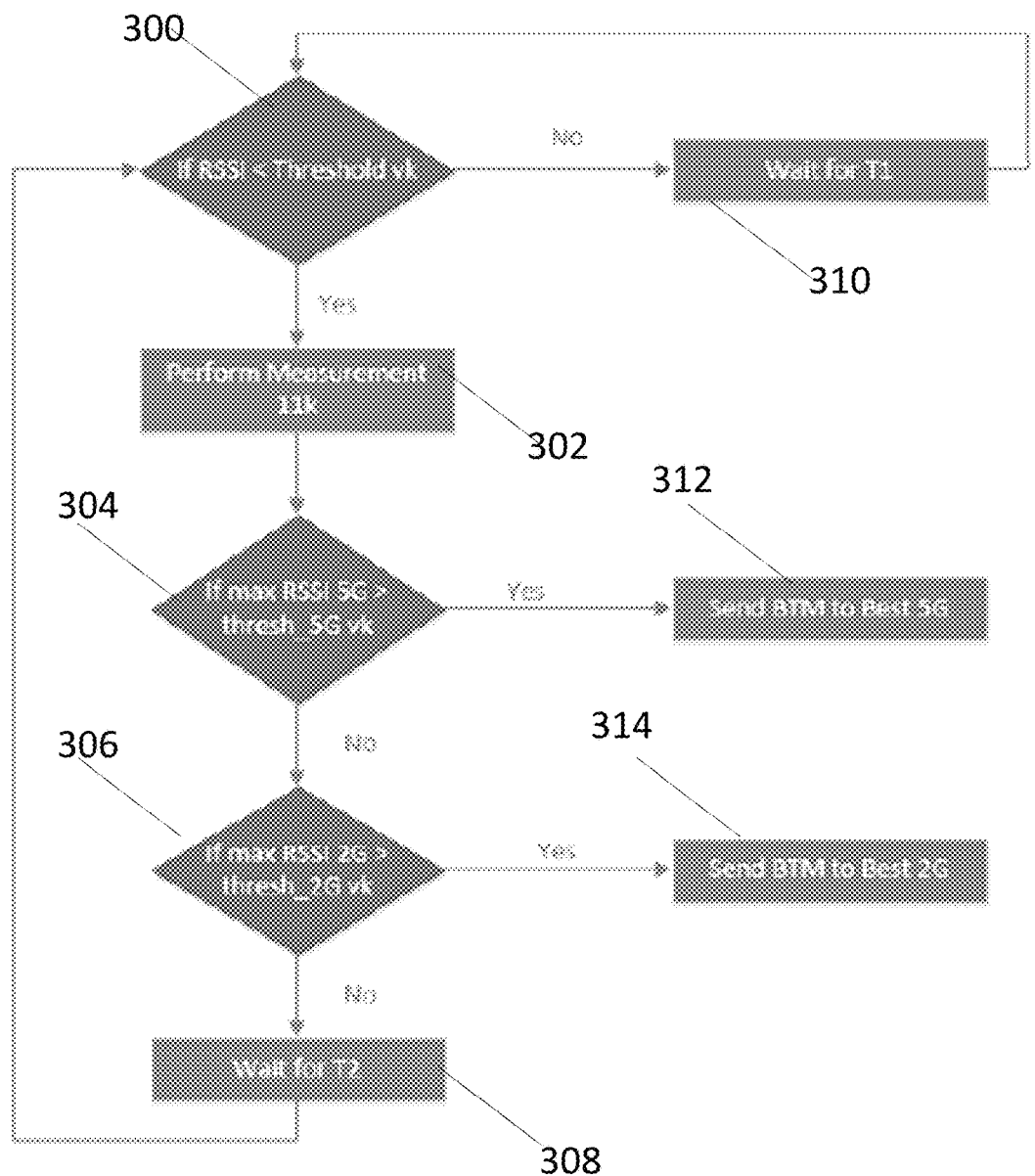
FIG. 6 is a flow diagram showing an 802.11k/v client roaming operational phase of a dedicated backhaul for whole home coverage according to the invention.
Figure 7:
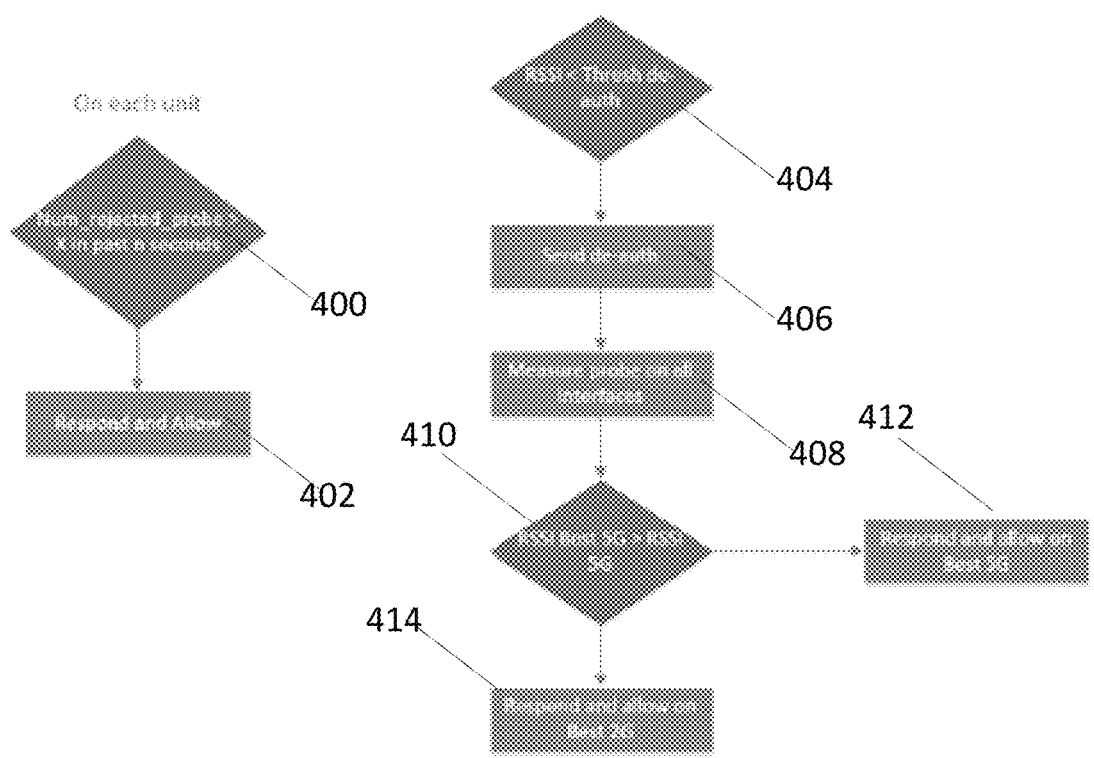
FIG. 7 is a flow diagram showing a legacy client steering operational phase of a dedicated backhaul for whole home coverage according to the invention.
Figure 8:
FIG. 8 is a flow diagram showing a 2.4 GHz channel selection operational phase of a dedicated backhaul for whole home coverage according to the invention.
Figure 9:
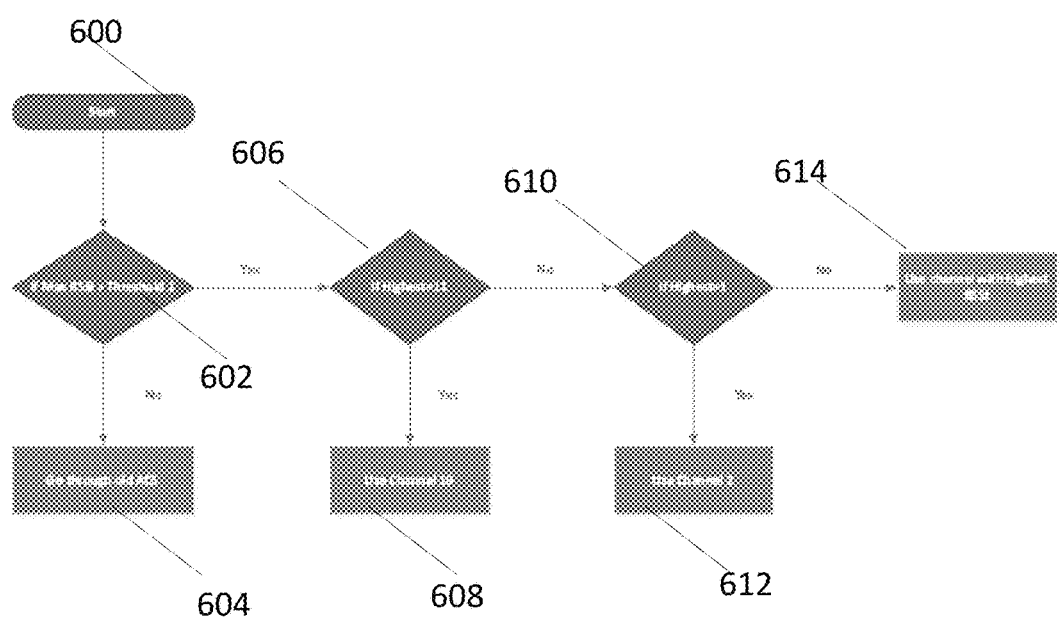
FIG. 9 is a flow diagram showing a system ACS operational phase of a dedicated backhaul for whole home coverage according to the invention.
Figure 10:
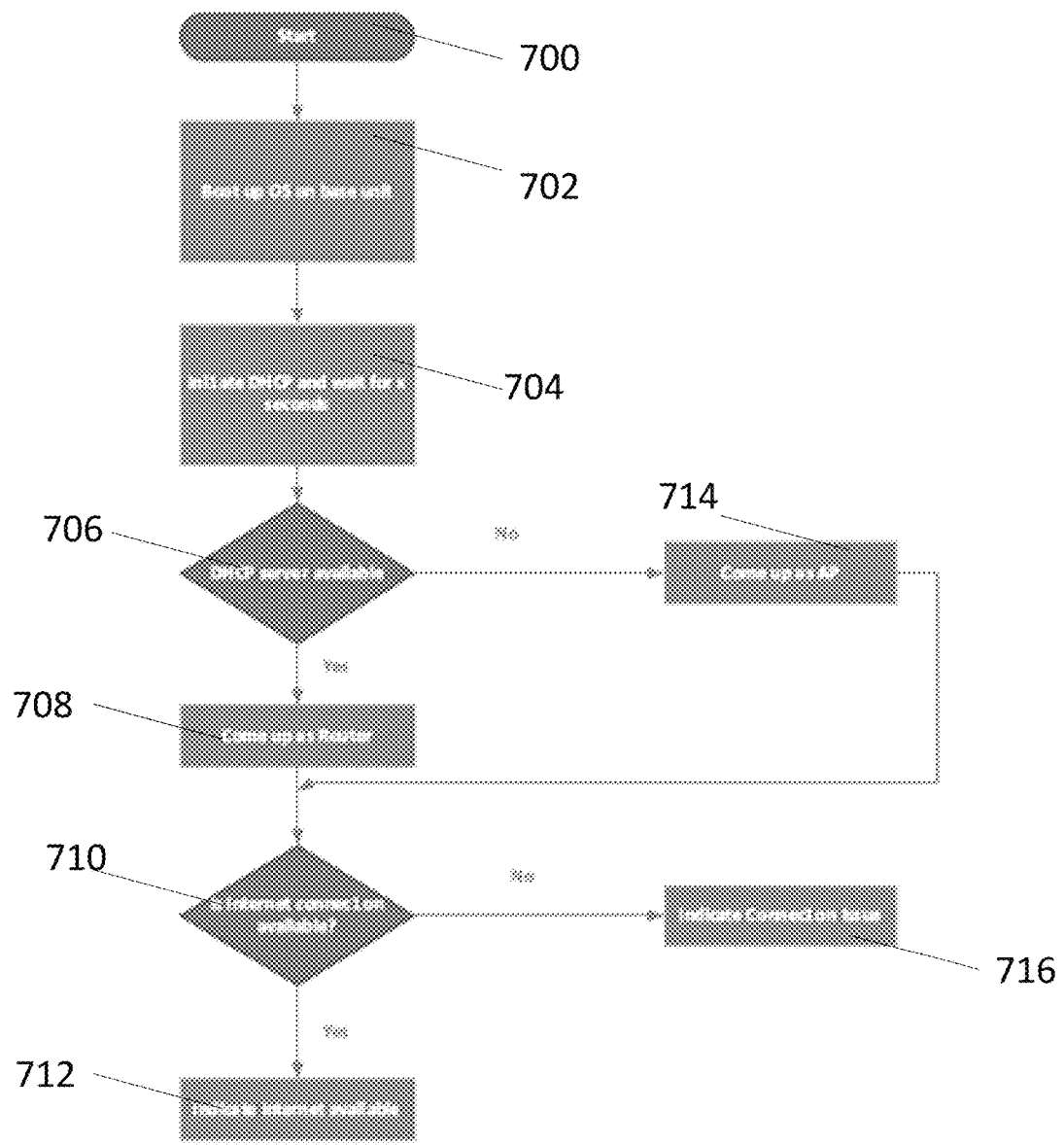
FIG. 10 is a flow diagram showing a router or bridge determination operational phase of a dedicated backhaul for whole home coverage according to the invention.
Figure 11:
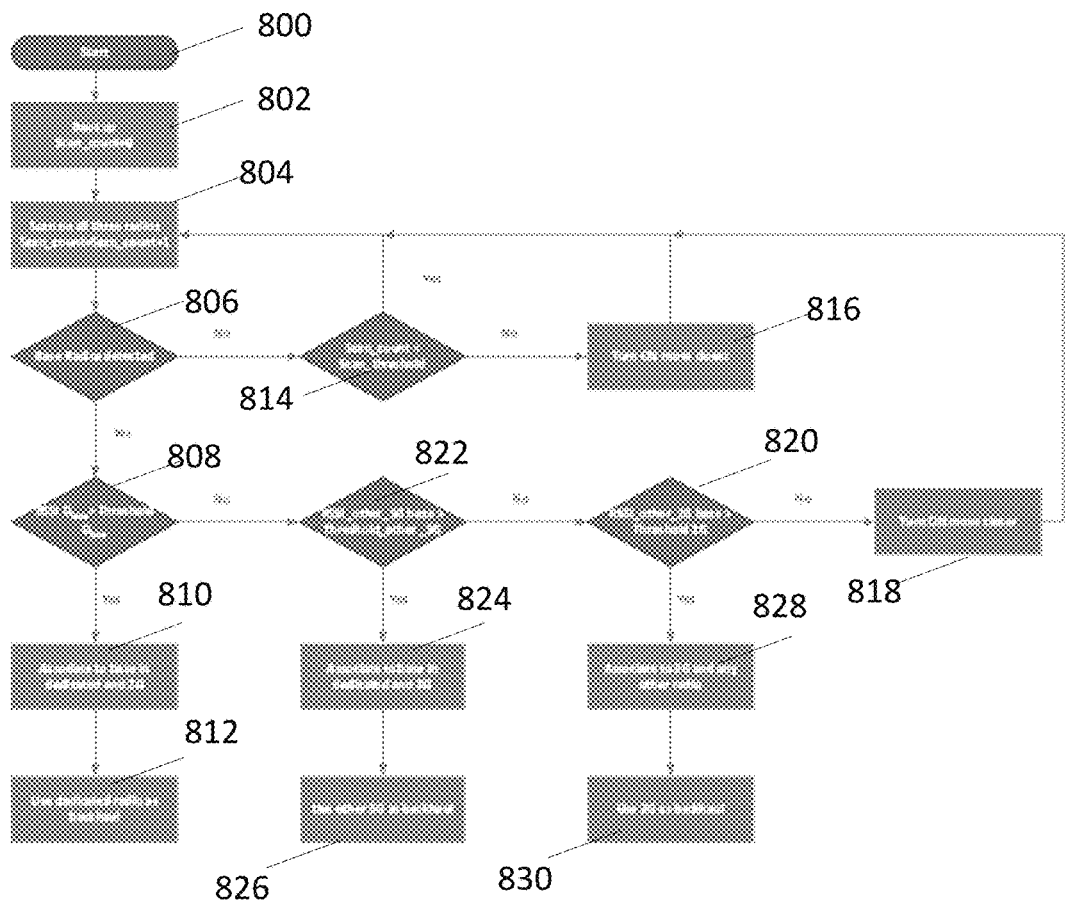
FIG. 11 is a flow diagram showing a detailed star topology boot up operational phase of a dedicated backhaul for whole home coverage according to the invention.

FIGS. 4-11 are flow diagrams showing operational phases of a dedicated backhaul for whole home coverage according to the invention, where FIG. 4 shows a star topology boot up, FIG. 5 shows a daisy chain flow chart, FIG. 6 shows 802.11k/v client roaming, FIG. 7 shows legacy client steering, FIG. 8 shows 2.4 GHz channel selection, FIG. 9 shows system ACS, FIG. 10 shows router or bridge determination, and FIG. 11 shows a detailed star topology boot up. In some embodiments, 802.11r is used to speed up key exchange.

Topology defines the arrangement in which nodes are connected in the network, including which nodes are directly connected and which communication channel and technology is used for different nodes to talk. Star topology is an arrangement in which all the nodes are directly connected to the base node. The base node is the node that is connected to the home gateway. In star topology, the software running on the satellite and base nodes makes a decision as which wireless band works the best for connection between the satellite and the base. A dedicated wireless band is the preferred method of wireless communication if the dedicated band is available for communication and the quality of the dedicated link is better than a defined threshold.

Wireless features in embodiments of the invention include star topology or daisy chain topology given network topology and channel conditions, client steering, unit on-boarding using a vendor specific information element (VIE) and WPS, auto channel selection (ACS) and 2.4G bandwidth, Bluetooth low energy (BLE), and channel planning. For purposes of the discussion herein, a VIE is an information element (IE) that a vendor, such as Netgear, can add to communicate information that is specific to that vendor. All of the IEs that are described herein are vendor IEs.

For star only, the 5 GHz dedicated channel is the primary backhaul channel. If 5 GHz does not work, the system tries to use the 2.4 GHz band. The unit associates on both bands and uses 5 GHz if the RSSI is above a predefined threshold, e.g. −80 dBm. If the RSSI is below the threshold, the satellite unit uses the 2.4 GHz band as backhaul and the 5 GHz backhaul is not used. If the RSSI of the 2.4 GHz and 5 GHz bands is below a threshold (−80 dBm), an LED indicates that the unit needs to be moved closer.

In FIG. 4, a star topology boot up sequence begins with a start/reconnect (100), where a boot up Scan_count-0 (102). A scan is performed on all radios, where Scan_count-Scan_count+1 (104). If base radios are detected (106), they are associated to a base in a dedicated 5 GHz and 2.4 GHz band (108). If a determination RSSI $D_{base}$>Threshold $D_{base}$ (110) is made, then a dedicated radio is used as backhaul (112) and the system waits for T (114). The system then tries to associate a dedicated 5 GHz radio if one is not already associated (116) and a determination RSSI $D_{base}$>Threshold $D_{base}$ (110) is made. If a determination RSSI $D_{base}$>Threshold $D_{base}$ (110) is not made, where RSSI_2G base>Threshold 2G (120), then 2.4 GHz is used as backhaul if possible (118) and, if not, then the system turns a move closer notification on (122). If base radios are not detected (106), and Scan_count<Scan_threshold (124), then the system turns a no connection notification on (126).

In embodiments of the invention, a daisy chain is used. In daisy chain 5 GHz dedicated band is preferred if the RSSI meets predetermined thresholds. The system tries to use 5 GHz dedicated and star, if possible. If 5 GHz star cannot be used, the system tries using a 5 GHz daisy chain. If 5 GHz does not work in star or daisy chain topologies, the system tries using 2.4G as a last resort. A 5 GHz dedicated daisy chain is preferred over the 2.4 GHz band if the RSSI is good enough.

In FIG. 5, a daisy chain sequence starts (200), and the system scans on all three radios (202). If a radio is not found (204), the system indicates that the user should move closer (228). The system measures the following RSSI values:
RSSI $2G_{base}$=RSSI in 2.4 GHz,
RSSI $2G_{max}$=Max RSSI in 2.4 GHz,
RSSI $D_{base}$=RSSI of dedicated backhaul,
RSSI $D_{max}$=Max RSSI of dedicated backhaul (206) and, then determines if RSSI $D_{base}$>Threshold 1 (208). If so, the system associates to a base AP in a dedicated band and 2.4 GHz (210). If, however, RSSI $D_{base}$>Threshold 2 and hop count<max_hop (212), then the system associates to an AP with RSSI $D_{max}$ in 2.4 GHz and 5 GHz dedicated (214). Further, if RSSI $D_{base}$>Threshold 3, the system checks max hop count (216) and, if so, then associates to the base in the 2.4 GHz and 5 GHz backhaul (218). Again, if RSSI $D_{base}$>Threshold 4 and hop count<max_hop (220), then the system associates to the highest 2.4 GHz RSSI (222), and indicates that the user should move closer (226).

In embodiments of the invention, for client steering using basic service set (BSS) transition management (BTM), the system relies on 802.11v and 802.11k when available and when the client behaves. This is the safest steering. For on-band steering, the system uses the RSSI and loads to move clients from 2.4 GHz to 5 GHz. The system does not use load to move clients from 5 GHz to 2.4G. On moving clients from unit to unit, if the RSSI drops below some threshold, the system checks the RSSI of the other APs. If the RSSI of other APs is above a threshold on 5 GHz, the system moves to 5 GHz; if the RSSI of other APs is above some other threshold in the 2.4 GHz band, the system moves the clients to 2.4G of the other AP.

In FIG. 6, for 802.11k/v client roaming, if RSSI<threshold vk (300) is not true, then the system waits for T1 (310); and, if true, the system performs measurement 11k (302). If max RSSI 5G>thresh_5G vk (304), the system sends BTM to best 5 GHz (312). If not, the system determines if max RSSI 2G>thresh_2.G vk (306) and, if so, the system sends BTM to best 2.4 GHz (314), else the system waits for T2 (308).

In embodiments of the invention, wireless features for legacy client steering are used for clients that do not support 802.11v/k or clients that do not have the correct implementation. This client steering occurs during an idle period if the client has no uplink packets for X seconds. The RSSI threshold is below that which disconnects the client. The RSSI may be different for 2.4 GHz and 5 GHz. When the client connects back, the system tries to steer the client to the right AP by having it associate to an AP which has an RSSI above a threshold and hop count above a threshold. The system rejects a probe response and measures RSSI for X tries. The system then lets the client associate to any band of any radio it desires.

In FIG. 7, in a legacy client steering, on each unit, a determination is made if num_rejected_probe>X in past n seconds (400) and, if so, the unit responds and is allowed (402). The system for allowed units determines if RSSI<thresh de-auth (404), sends a de-auth (406), measures a probe on all interfaces (408), and determines RSSI best 5G>RSSI 5G (410). If the later is true, then the system responds and allows a backhaul on the best 5 GHz (412); else, the system responds and allows a backhaul on the best 2.4 GHz (414).

In embodiments of the invention, WPS is used for on-boarding new units on the backhaul and for addition of a unit with different backhaul credential to the network. WPS works with a hidden SSID on the backhaul. Only units with a VIE can go through WPS procedure on a dedicated channel.

In embodiments of the invention, the VIE is used to mark a device. The VIE is included in probes, beacons, association, and authentication frames, or a subset of these packets. A device looks for the VIE to see the other side. If the VIE is present, then the device goes through an eight-way handshake.

The vendor IE content includes capability, dedicated band, hop count, steering capabilities, and transmit power, 2.4 GHz channel planning, and 5 GHz channel planning.

There may be one or more VIEs that are defined by the vendor and that are used to give information about the node to new devices that have not connected or joined the network. The new devices must know what other devices are in the network, what capabilities the other nodes have, and how each device is connected to Internet, i.e. what data rate is available to the main router, how many hops, 2.4 GHz backhaul, 5 GHz backhaul. There is a version of software in the VIE with which each device can know what software the other devices are using, and with which the device can talk over using same application programming interface (API) structure.

On the satellite unit, if a backhaul connection not in place, WPS is used to find a backhaul connection. Once a credential is acquired on one backhaul channel, it is copied to the other one. If the backhaul credential is already in place and the unit is connected, a WPS button is used to initiate WPS with clients or other satellite units on a dedicated channel.

In embodiments of the invention, 2.4 GHZ channel selection is used if there are no APs in the vicinity. If there is an AP in the vicinity, the channel where the AP with highest RSSI resides is picked. The system only considers APs with an RSSI that is higher than −80 dBm for 20/40 MHz coexistence (enable by default) and ignores a 20/40 coexistence bit reported by clients (enable by default).

In FIG. 8, a 2.4 GHz channel selection starts (500). If max RSSI>threshold 1 (−50 dBm) (502), then the system uses the channel with highest RSSI (506); else, the system goes through the ACS and is aggressive on picking 40 MHz (504).

In embodiments of the invention, BLE sets up the SSID and password. BLE is also used for Wi-Fi diagnosis purposes. BLE may be used to allow guest access and BLE mesh.

BLE has a mode which is referred to as Generic Attribute Profile (GATT). In GATT, it is not necessary for two device to pair and go through a pairing process before they can communicate over BLE. As a result, any BLE capable device can get information over BLE. Thus, new devices in a home can get an SSID and password using BLE, and they can use that SSID and password to connect to Wi-Fi if the user wants to use Wi-Fi and if the network owner gives permission to the new device.

Moreover, when the Wi-Fi network is down due to any failure, BLE may be used for debugging the issues, resetting the network setting, or any other diagnosis or action that needs to be taken when there is a problem.

BLE range is very limited compared to Wi-Fi. Because the dedicated backhaul has a range that can be as high 20× that of BLE, embodiment of the invention can use the dedicated backhaul to propagate the information on all devices. When the device is close to any of the other devices, the device can talk to close devices, and the close device can use the dedicated backhaul to send the information back to main device or any other device that needs diagnosis or any actions.

The dedicated backhaul can also be used to extend range of BLE to different points around the home. For example, an LED light can be controlled using a device better than a traditional access point because any device can receive an LED BLE signal and can repeat back the information using the dedicated backhaul to any other devices or to a cloud backend that controls the LED light. The same is true for any BLE sensor or BLE controlled device.

In embodiments of the invention, the 5 GHz backhaul includes MU-MIMO support. A different 2.4G channel may be used for different units and different 5 GHz client facing channels may be used on different units. Because MU-MIMO requires both sides of the link to have MU-MIMO support and have a good transmit and receive algorithm for MU-MIMO, embodiments of the invention use MU-MIMO between the devices, especially if there is only one base station.

Embodiments of the invention provide auto channel selection (ACS) during initial boot up. The algorithm for this feature scans all of the channels, then collects appropriate statistics, such as interferences (both WLAN and non-WLAN) and assigns weights to each channel.

In FIG. 9, a system ACS starts (600). If ma RSSI>threshold 1 (602) is not true, then the system goes through ACS (604); else the system determines if highest=11 (606). If so, then the system uses channel 10 (608); else, the system determines if highest=1 (610). If so, then the system uses channel 2 (612); else, the system uses the channel with the highest RSSI (614).

In FIG. 10, a router or bridge determination starts (700). The system boots up the OS on the base unit (702), initiates DHCP, and wait for x seconds (704). If a DHCP server is not available (706), the base unit comes up as an AP (714); else, the base unit comes up as a router (708). If an Internet connection is not available (710), the system indicates a connection issue (716); else, the system indicates that the Internet is available (712).

In FIG. 11, a star topology boot up starts (800) and the boot up, scan_count=0 (802). The system scans on all three radios, where scan_count=scan_count+1 (804).

If base radios are not detected (806), then scan_count<scan_threshold (814), and the system turns move closer indicator on (816).

If base radios are detected (806), and RSSI $D_{base}$>threshold $D_{base}$ (808) is true, then the system associates to a base in the dedicated and 2.4 GHz (810) and uses a dedicated radio as a backhaul (812).

If base radios are detected (806) and RSSI $D_{base}$>threshold $D_{base}$ (808) is false, then if RSSI_other_5G base>threshold_other_5G (822) is false and RSSI_other_2G base>threshold 2G (820) is false, the system turns a move closer indicator on (818).

If base radios are detected (806) and RSSI $D_{base}$>threshold $D_{base}$ (808) is false, then if RSSI_other_5G base>threshold_other_5G (822) is true, then the system associates to a base in the dedicated and 2.4 GHz band (824) and uses the other 5 GHz radio as a backhaul (826).

If base radios are detected (806) and RSSI $D_{base}$>threshold $D_{base}$ (808) is false, then if RSSI_other_5G base>threshold_other_5G (822) is false and RSSI_other_2G base>threshold 2G (820) is true, then the system associates to 2.4 GHz and any other radio (828) and uses 2.4 GHz as the backhaul (830).

Statistic Collection and Algorithm Guidelines.

The following discussion describes the statistics that are collected during a scan and general guidelines on how to use the statistics. The following is a list of items that must be taken into account in embodiments of the invention:

1) The number of APs on each channel is counted accurately during the scan. The buffer size is limited for the scan and as a result, when there are many APs, the APs on higher channels do not fit into the limited buffer size. As a result, scanning in 2.4G is broken into at least three separate scans in three subsets of the channel to make sure all APs are seen on all channels.

2) Scan time is increased on each channel such that all the APs are seen.

3) If one or more APs with an RSSI of −45 dBm or higher are within vicinity, the channel of the AP which has highest RSSI is picked. If the AP is 40 MHz, the same primary channel is picked.

4) Interference from neighboring channels is taken into account. The channel with smallest grade is the best.

E=constant which depends on AP RSSI

If 20 MHz AP is on Z=channel CH, CH−1, CH+1, Grade_on_channel_Z=Grade_on_channel_Z+2*E If 20 MHz AP is on Z=CH−2, CH+2, Grade_on_channel_Z=Grade_on_channel_Z+E If 40 MHz AP, for both 20 MHz subchannels of the 20 MHz, apply grade calculation as described above.

5) The RSSI of APs is taken into account. Grade in the following is the grade on the AP channel and all affected neighboring channels. The following may be used to start for 4×4:

AP RSSI<−70 dBm⇒E=1

−70 dB<AP RSSI<−40 dB⇒E=1.5

RSSI>−40 dB⇒E=2

6) Noise floor on each channel is measured during scan:

tmpnoise=(noise_db<−95)?−95: noise_db tmpnoise=(noise_db>=−65)?−65: noise_db noise_grade=(tmpnoise+95)/5*4

7) For a 40 MHz channel selection, the 20/40 coexistence (wl obss_coex) is taken into account. If there is no 40 MHz channel available because of coexistence requirement, the best 20 MHz channel is selected.

8) Transmit power on each channel is taken into account. Channel 1 and channel 11 shall be avoided in the US and Australia.

9) Channel utilization on each channel is measured during scan. Channel utilization includes CCA stats and percentage of the time that the channel is clean.

10) Interference statistics on each channel are measured during the scan and may be used.

11) Each unit may take into account the channels that are used by other APs in the network. For example, ACS may decide to use different channels on different units.

Notes

Dynamic Frequency Selection (DFS).

In embodiments of the invention, the backhaul channel in European Telecommunications Standards Group (ETSI) is on the radar band. In an FCC locale, the radar band may be used when the non-radar backhaul channel has interference. If radar shows up, it is necessary to change the backhaul, e.g. moving the channel in coordinated way; and communication of dynamic frequency selection (DFS) detection between different nodes in the mesh network, e.g. using 2.4 GHz, the other 5 GHz, and/or 802.11h. Action frames and/or beacon frames from 802.11h may be extended for use-case of mesh.

When radar shows up, the units use layer 2, 3, or the application layer to notify each other of radar entry and coordinate a backhaul move. This coordination and move must be performed during the time that is allowed by regulatory bodies. The client facing coordinating radios, including 2.4 GHz radio, may be used to communicate and move the backhaul, if backhaul communication coordination can be performed within the time that the regulatory bodies allow before shutting down communication. In this case, the other two radios, which are not dedicated backhaul radios, move to the same channel and start communication to pick a new backhaul. If not, a new backhaul can be chosen, and the two other radios are shared for backhaul and front haul. This not a desired outcome and is done only if no backhaul channel is available due to radar events.

Channel Planning for Client Facing Radios.

In embodiments of the invention, different 2.4 GHz channels are used when 2.4G is not used as backhaul. Changing the channel of the 5 GHz band; and/or changing of the channel is used to avoid congestion. Channel coordination is done to use the cleanest channels among multiple nodes depending on available traffic Changing Basic Rate Set Per Topology.

In embodiments of the invention the beacon rate is changed to force clients to roam; and/or the management frame rate is changed.

Changing Transmit (TX) Power Per Distance.

In embodiments of the invention maximum transmit power may be dropped on mesh nodes if the mesh node coverage is smaller than what its peak power allows. Transmit power of some management or control frames may be dropped. Transmit power of some certain modulation and or coding may be dropped. Transmit power to some certain client may be dropped Mobility Control Over Dedicated Backhaul.

In embodiments of the invention data is sent between different modules and used to decide how to roam, when to roam, and send packets to client to roam. Roaming is done based on best effective rate, interference, and type of data.

The AP over which a client is connected is monitoring the client wireless state, as well as the traffic the client sends over Wi-Fi. Once the AP sees any reason for a client to be considered for roaming, it communicates to the other APs and gets information from them on the state of wireless channels that the other APs see. Moreover, the AP queries the client on what the client sees from the network. Once all of the information is gathered, a final decision is made by the AP whether the client is connected to another AP, depending on the network configuration. The decision is communicated over the dedicated backhaul, and then an attempt is made to roam the client. Coordination of roaming, including what time to send a roaming trigger to the client and which AP to respond to after roaming has started, happens over the dedicated backhaul as well.

Bluetooth Mesh/Bluetooth Over Wi-Fi.

Embodiments of the invention extend Bluetooth across home over Wi-Fi or over Bluetooth mesh. The Bluetooth signal may be decoded the bits may be sent over Wi-Fi backhaul to a node which is close to destination and Bluetooth packet may be transmitted at that node.

Computer System

Figure 12:
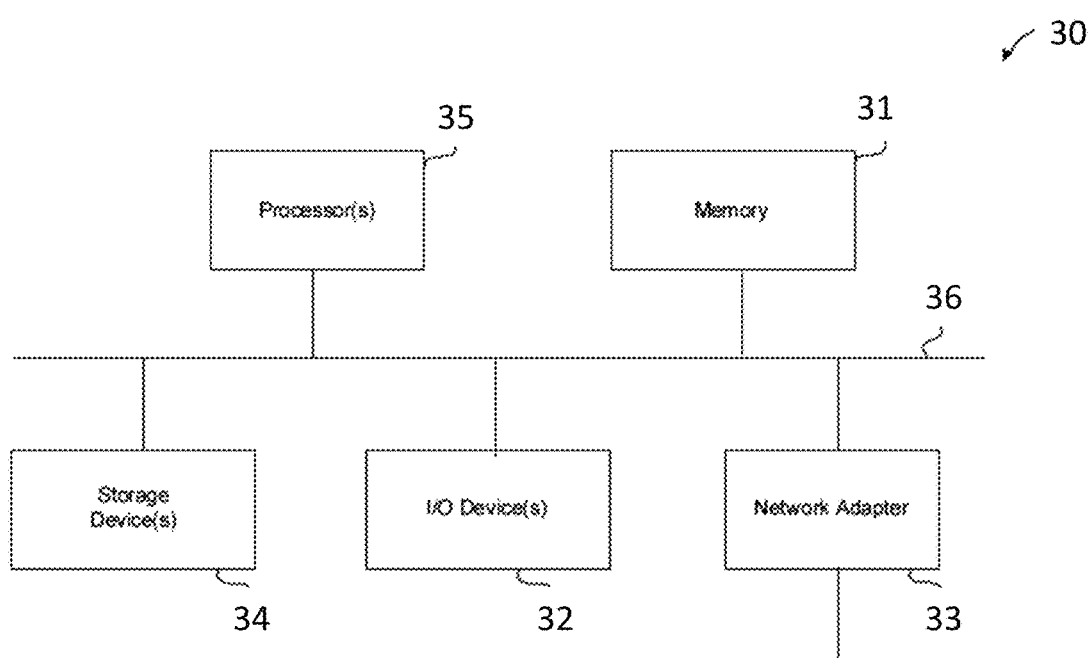
FIG. 12 shows a diagrammatic representation of a machine in the example form of a computer system within which a set of instructions for causing the machine to perform one or more of the methodologies discussed herein may be executed.

FIG. 12 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 30 may include one or more processors 35; memory 31; input/output devices 32, e.g. keyboard and pointing devices, touch devices, display devices; storage devices 34, e.g. disk drives; and network adapters 33, e.g. network interfaces, that are connected to an interconnect 36. The interconnect 36 is illustrated as an abstraction that represents any one or more separate physical buses, point to point connections, or both connected by appropriate bridges, adapters, or controllers. The interconnect 36, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 31 and storage devices 34 are computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 31 can be implemented as software and/or firmware to program the processor 35 to carry out actions described above. In some embodiments, such software or firmware may be initially provided to the processing system 30 by downloading it from a remote system through the computing system 30, e.g. via network adapter 33.

The various embodiments introduced herein can be implemented by, for example, programmable circuitry, e.g. one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method, comprising:
using a 5 GHz band as a dedicated backhaul between two or more nodes in a network when the received signal strength indication (RSSI) of the dedicated channel is above a predefined threshold;
using a different radio, channel, or band as backup if the 5 GHz band fails to reach between nodes;
using a 2.4 GHz band channel selection when no base nodes are proximate to a satellite node; and
when a base node is proximate to the satellite node, picking a channel where a base node with a highest RSSI value is located.

2. The method of claim 1, further comprising:
using a 2.4 GHz band as backup if the 5 GHz band fails to reach between nodes.

3. The method of claim 1, further comprising:
using Ethernet when it is better than the 5 GHz and 2.4 GHz bands and it is available.

4. The method of claim 1, further comprising:
using a spanning tree protocol or a variant thereof to avoid loops.

5. A method, comprising:
using a 5 GHz band as a dedicated backhaul between two or more nodes in a network when the received signal strength indication (RSSI) of the dedicated channel is above a predefined threshold;
using a different radio, channel, or band as backup if the 5 GHz band fails to reach between nodes;
arranging a plurality of nodes in a daisy chain and using probe request contents to communicate hop count and link quality between the nodes by attempting to route directly if link quality is better than a predefined threshold;
wherein for each extra hop, there must be some percentage gain over smaller hops; and
wherein the link is not used when it is below said predefined threshold.

6. The method of claim 1, further comprising:
using nodes in communication with each other via the dedicated backhaul to configure a new node in the network.

7. The method of claim 1, further comprising:
a plurality of nodes connected in star topology in which one or more satellite nodes are each directly connected to a base node using a dedicated band for communication when quality of the dedicated link exceeds a predefined threshold.

8. The method of claim 1, further comprising:
establishing said dedicated backhaul in any of a star topology when appropriate, daisy chain when needed, client steering, unit on-boarding using VIE and Wi-Fi protected setup (WPS), auto channel selection (ACS) and 2.4 GHz bandwidth, Bluetooth low energy (BLE), and channel planning.

9. A method, comprising:
using a 5 GHz band as a dedicated backhaul between two or more nodes in a network when the received signal strength indication (RSSI) of the dedicated channel is above a predefined threshold;
using a different radio, channel, or band as backup if the 5 GHz band fails to reach between nodes;
connecting a plurality of nodes in star topology in which one or more satellite nodes are each directly connected to a base node using a dedicated band for communication when quality of the dedicated link exceeds a predefined threshold;
using a 5 GHz dedicated channel as a primary backhaul channel;
a satellite unit node associating with said base node on both the 5 GHz and 2.4 GHz bands and using the 5 GHz band if an RSSI value is above a predefined threshold;
when the RSSI value is below said threshold, the satellite unit using the 2.4 GHz as backhaul; and
when the RSSI value of both said 2.4 GHz band and said 5 GHz band is below said threshold, said satellite unit providing an indication that it should be moved closer to said base node.

10. The method of claim 9, further comprising:
a satellite node beginning a scan on all of a plurality of bands with a Scan_count;
when a base radio is detected, associating said satellite node to said base in a dedicated 5 GHz and 2.4 GHz band;
when a determination RSSI $D_{base}$>Threshold $D_{base}$ is made, using a dedicated radio as the backhaul and waiting for T;
trying to associate a dedicated 5 GHz radio if one is not already associated and determining RSSI $D_{base}$>Threshold $D_{base}$;
when a determination RSSI $D_{base}$>Threshold $D_{base}$ is not made, where RSSI_2G base>Threshold 2G, then using the 2.4 GHz band as a backhaul if possible and, if not, said satellite node turning on a move closer notification; and
when a base node is not detected and Scan_count<Scan_threshold, said satellite node turning one a no connection notification.

11. A method, comprising:
using a 5 GHz band as a dedicated backhaul between two or more nodes in a network when the received signal strength indication (RSSI) of the dedicated channel is above a predefined threshold;
using a different radio, channel, or band as backup if the 5 GHz band fails to reach between nodes;
establishing said dedicated backhaul in any of a star topology when appropriate, daisy chain when needed, client steering, unit on-boarding using VIE and Wi-Fi protected setup (WPS), auto channel selection (ACS) and 2.4 GHz bandwidth, Bluetooth low energy (BLE), and channel planning;
initially using a 5 GHz dedicated backhaul and star topology on launch;
using a daisy chain after launch on RSSI and using the 5 GHz band as the dedicated backhaul when a star topology cannot be used; and
when the 5 GHz band does not work in star or daisy chain topologies, using the 2.4G band.

12. The method of claim 11, further comprising:
a satellite node starting a daisy chain sequence and scanning on all satellite node radios;
said satellite node providing an indication to move the satellite node closer to the base node when a base node is not found;
said satellite node measuring the following RSSI values:
RSSI $2G_{base}$=RSSI in 2.4 GHz,
RSSI $2G_{max}$=Max RSSI in 2.4 GHz,
RSSI $D_{base}$=RSSI of dedicated backhaul, ands
RSSI $D_{max}$=Max RSSI of dedicated backhaul);
determining if RSSI $D_{base}$>Threshold 1 and, if so, associating to a base node in a dedicated band and 2.4 GHz;

else determining if RSSI $D_{base}$>Threshold 2 and hop count<max_hop (212), then associating to said base node with RSSI $D_{max}$ in 2.4 GHz and 5 GHz dedicated;

else determining if RSSI $D_{base}$>Threshold 3, the checking max hop count and, if so, then associating to the base node in the 2.4 GHz band and 5 GHz backhaul; and else determining if RSSI $D_{base}$>Threshold 4 and hop count<max_hop, then associating to a highest 2.4 GHz RSSI and indicating that the satellite node should be moved closer to the base node.

13. A method, comprising:

using a 5 GHz band as a dedicated backhaul between two or more nodes in a network when the received signal strength indication (RSSI) of the dedicated channel is above a predefined threshold;

using a different radio, channel, or band as backup if the 5 GHz band fails to reach between nodes;

when client steering using basic service set (BSS) transition management (BTM), relying on 802.11v and 802.11k when available;

for on-band steering, a base node using an RSSI value and loading to move clients from the 2.4 GHz band to the 5 GHz band but not to move clients from the 5 GHz band to the 2.4 GHz band;

when moving clients from unit to unit, when the RSSI value at the base node drops below a predetermined threshold, checking an RSSI value at other base nodes;

when the RSSI value at the other base nodes is above a threshold on the 5 GHz band, moving to the 5 GHz band; and when the RSSI of other base nodes is above a predetermined threshold in the 2.4 GHz band, moving the clients to the 2.4 GHz band of the other base nodes.

14. A method, comprising:

using a 5 GHz band as a dedicated backhaul between two or more nodes in a network when the received signal strength indication (RSSI) of the dedicated channel is above a predefined threshold;

using a different radio, channel, or band as backup if the 5 GHz band fails to reach between nodes;

using legacy client steering for clients that do not support 802.11v/k or clients that do not have the correct implementation during an idle period when the client has no uplink packets for a predetermined time and a RSSI threshold value is below that which disconnects the client;

when the client connects back, trying to steer the client to a correct base node by having it associate to a base node which has an RSSI value above a predetermined threshold and a hop count above a predetermined threshold;

rejecting a probe response and measuring the RSSI value for a predetermined number of tries; ands letting the client associate to any band of any base node it chooses.

15. The method of claim 14, further comprising:

on each client, making a determination if num_rejected_probe>X in past n seconds and, if so, the client responding and is allowed;

for allowed clients, determining if RSSI<thresh de-auth; sending a de-auth;

measuring a probe on all interfaces; and determining RSSI best 5G>RSSI 5G and, if true, responding and allowing a backhaul on a node with a best 5 GHz band;

else, responding and allowing a backhaul on a node with a best 2.4 GHz band.

16. A method, comprising:

using a 5 GHz band as a dedicated backhaul between two or more nodes in a network when the received signal strength indication (RSSI) of the dedicated channel is above a predefined threshold;

using a different radio, channel, or band as backup if the 5 GHz band fails to reach between nodes;

using a Wi-Fi protected setup (WPS) procedure for on-boarding new devices on the dedicated backhaul and for addition of devices having a different backhaul credential to the network;

wherein the WPS procedure has a hidden SSID on the dedicated backhaul;

wherein only devices with a vendor IE can go through the WPS procedure on a dedicated channel; and wherein the vendor IE content comprises any of capability, dedicated band, hop count, steering capabilities, transmit power, 2.4 GHz band channel planning, and 5 GHz band channel planning.

17. The method of claim 16, further comprising:

on a satellite node, if a dedicated backhaul connection is not in place, using WPS to find a backhaul connection;

once a credential is acquired on one backhaul channel, copying said credential to other backhaul channels;

wherein when the backhaul credential is already in place and the satellite node is connected, initiating WPS with satellite nodes on a dedicated channel.

18. The method of claim 17, further comprising:

beginning a 2.4 GHz band channel selection;

if max RSSI>threshold 1, then using a channel with a highest RSSI value;

else, using auto channel selection (ACS).

19. The method of claim 18, further comprising:

if ma RSSI>threshold 1 is not true, then using ACS;

else determining if highest=11;

if so, using channel 10;

else, determining if highest=1;

if so, using channel 2 (612);

else, using a channel with a highest RSSI value.

20. A method, comprising:

using a 5 GHz band as a dedicated backhaul between two or more nodes in a network when the received signal strength indication (RSSI) of the dedicated channel is above a predefined threshold;

using a different radio, channel, or band as backup if the 5 GHz band fails to reach between nodes;

performing a router or bridge determination;

booting up an OS on a base node;

initiating DHCP and waiting for a predetermined interval;

if a DHCP server is not available, said base node coming up as an access point (AP);

else, the base node coming up as a router;

if an Internet connection is not available, said base node indicating a connection issue;

else, said base node indicating that the Internet is available.

21. A method, comprising:

using a 5 GHz band as a dedicated backhaul between two or more nodes in a network when the received signal strength indication (RSSI) of the dedicated channel is above a predefined threshold;

using a different radio, channel, or band as backup if the 5 GHz band fails to reach between nodes;

starting a star topology boot up where a boot up, scan_count=0;

scanning on all satellite node radios, where scan_count=scan_count+1;

if base radios are not detected, then scan_count<scan_threshold and the satellite node providing a move closer indication;

if base radios are detected and an RSSI value $D_{base}$>threshold $D_{base}$ is true, then the satellite node associates to a base node in a dedicated and 2.4 GHz band and uses a dedicated radio as a backhaul;

if base radios are detected and the RSSI $D_{base}$>threshold $D_{base}$ value is false, if RSSI_other_5G base>threshold_other_5G is false, and RSSI_other_2G base>threshold 2G is false, the satellite node providing a move closer indicator;

if base radios are detected and the RSSI value $D_{base}$>threshold $D_{base}$ is false and if RSSI_other_5G base>threshold_other_5G (822) is true, then the satellite node associating to a base node in the dedicated and 2.4 GHz band and using another 5 GHz radio as a backhaul; and if base nodes are detected, an RSSI value $D_{base}$>threshold $D_{base}$ is false, if RSSI_other_5G base>threshold_other_5G is false, and RSSI_other_2G base>threshold 2G is true, then the satellite node associating to the 2.4 GHz band and any other radio and using 2.4 GHz as the backhaul.

\* \* \* \* \*